United States Patent [19]

Takahashi et al.

[11] Patent Number: 5,210,827
[45] Date of Patent: May 11, 1993

[54] NEST LEVEL JUDGING DEVICE FOR JUDGING THE STARTING AND THE END ADDRESSES

[75] Inventors: Kousuke Takahashi; Tetsuya Yamazaki, both of Tokyo, Japan

[73] Assignee: NEC Corporation, Tokyo, Japan

[21] Appl. No.: 621,715

[22] Filed: Dec. 5, 1990

[30] Foreign Application Priority Data

Dec. 5, 1989 [JP] Japan .................................. 1-316653

[51] Int. Cl.⁵ ......................... G06F 15/00; G06F 7/04
[52] U.S. Cl. ..................................... 395/200; 395/800;
364/919; 364/940.81; 364/942.7; 364/947.5;
364/DIG. 2; 370/85.5
[58] Field of Search ....................... 395/800, 250, 200;
370/85.5

[56] References Cited

U.S. PATENT DOCUMENTS

| | | | |
|---|---|---|---|
| 4,747,100 | 3/1988 | Roach et al. ....................... | 370/85.5 |
| 4,750,114 | 6/1988 | Hirtle ................................. | 395/250 |
| 4,916,660 | 4/1990 | Takahashi .......................... | 395/200 |

Primary Examiner—Thomas C. Lee
Assistant Examiner—Meng-Ai T. An
Attorney, Agent, or Firm—Foley and Lardner

[57] ABSTRACT

When a nest level judging device is supplied with tokens each of which has a nest level selected from first through N-th nest levels as a selected level and each of which comprises a header and a data set where the header comprises a data length code and a data identifier code including a nest bit, a counter (31) produces an address signal for specifying starting and end addresses of each of the tokens and a varying address varying from the starting address to the end address. Supplied with the header, a header register (32) produces a data length signal representative of the data length code and a nest bit signal which represents that the each of the tokens is nested in the data set thereof. Supplied with the address signal and the data length signal, an end address calculator (33) calculates the end address of the respective tokens and produces an end address signal representative of the end address. Responsive to selection signals, a selector (34) delivers the end addresses of the respective tokens as first through N-th end addresses. Supplied with the nest bit signal, the address signal, and the first through the N-th end addresses, a decision unit (35) decides a decided nest level, indicative of one of the first through the N-th nest levels that is selected as the selected level. The level decision unit delivers the decided nest level as one of the selection signals to the selector.

2 Claims, 4 Drawing Sheets

NEST LEVEL JUDGING DEVICE FOR JUDGING THE STARTING AND THE END ADDRESSES

BACKGROUND OF THE INVENTION:

This invention relates to a nest level judging device for use in a protocol conversion system.

A protocol conversion system is for use in an information communication network between heterogeneous data processing systems. When used between heterogeneous data processing systems, the information communication network is for mutually connecting the heterogeneous data processing systems together either in a local area or between local areas to carry out information interchange between the heterogeneous data processing systems. It is expected that such an information communication network will wide spread among the society information. The information network is generally built on the basis of a network architecture systematized according to a protocol.

Inasmuch as such a protocol has been originally developed by computer makers, it is impossible to carry out the information interchange between the heterogeneous data processing systems. In order to solve this problem, a standard protocol has been established by International Organization for Standardization (ISO). This standard protocol is called a layer protocol of Open Systems Interconnection (OSI) in the art. Such a layer protocol is disclosed in a book written by William Stallings and published by Macmillan Publishing Company, New York, under the title of "DATA AND COMPUTER COMMUNICATIONS", pages 394 to 408, Chapter 12.

The layer protocol consists of seven layers which comprise a physical layer, a data link layer, a network layer, a transport layer, a session layer, a presentation layer, and an application layer. The application layer comprises a plurality of sublayers, for example, sixty-four or more sublayers. Each layer of the layer protocol has a processing function which should be standardized between the computer makers. Inasmuch as the layer protocol of the OSI is well-defined, it is possible to carry out protocol conversion between the layer protocol and a specific protocol developed by a certain computer maker. Each of the heterogeneous data processing systems comprises a protocol conversion system for carrying out the protocol conversion, by which it is possible to carry out the information interchange between the heterogeneous data processing systems.

Attention will be directed to the application layer. As is known in the art, the application layer is divisible into first through N-th sublayers, where N represents a predetermined natural number which is equal to, for example, sixty-four. The first through the N-th sublayers are referred to first through N-th nest levels in the art, respectively. The first through the N-th nest levels are a lowest through a highest nest levels, respectively. According to the application layer, data transmission is carried out between the heterogeneous data processing systems on the basis of Message Handling Systems (MHS) recommended by the International Telegraph and Telephone Consultive Committee (CCITT) Recommendation X. 409. More specifically, data are transmitted between the heterogeneous data processing systems as a plurality of tokens.

Each of the tokens has a nest level selected from the first through the N-th nest levels as a selected level. Each of the tokens comprises a header and a data set as described in Chapter 12 of the above-mentioned book. The data set has a data length and is for nesting one of the tokens that has a higher nest level than the selected level and will be referred to as a particular token. The header comprises a data length code representative of the data length and a data identifier code. The data identifier code includes a nest bit indicative of whether or not the particular token is nested in the data set.

In the protocol conversion system, the selected level must be judged. A conventional method for judging the selected level has been performed by software in computer. According to the conventional method, the tokens are memorized in a memory. The tokens are successively read from the memory to a central processing unit (CPU) as read-out tokens. The software is used in judging the selected level from the read-out tokens. The conventional method has therefore been disadvantageous in that a large processing time is consumed to judge the selected level. As a result, it is impossible to rapidly and smoothly carry out the information interchange.

In order to remove the above-described disadvantage, an improved nest level judging device is disclosed in U.S. Pat. No. 4,916,660 issued to Kousuke Takahashi, the instant applicant, and assigned to the instant assignee. Briefly, the improved nest level judging device comprises a detecting circuit for detecting the nest bit to produce a nest bit detection signal and a selection circuit for delivering the data length codes of the respective tokens as first through N-th data codes in response to selection signals. The improved nest level judging device further comprises a processing circuit for processing the first through the N-th data codes into a processed signal which is N bits long. Responsive to the nest bit detection signal and the first through N-th data codes, a level decision circuit decides a decided nest level indicative of one of the first through the N-th nest levels that is selected as the selected level. The level decision circuit supplies the decided nest level as one of the selection signals to the selection circuit.

Although the improved nest level judging device can judge the decided nest level at a high speed, it requires a large amount of hardware.

SUMMARY OF THE INVENTION

It is therefore an object of this invention to provide a nest level judging device which is operable at a high speed.

It is another object of this invention to provide the above-described nest level judging device comprising a small amount of hardware.

Other objects of this invention will become clear as the description proceeds.

On describing the gist of this invention, it is possible to understand that a nest level judging device is supplied with a plurality of tokens from a memory for memorizing each of the tokens starting at a starting address and ending at an end address. Each of the tokens has a nest level selected from first through N-th nest levels as a selected level, where N represents a predetermined natural number. The first through the N-th nest levels are a lowest through a highest nest level, respectively. Each of the tokens comprises a header and a data set. The data set has a data length and is for nesting one of the tokens that has a higher nest level than the selected level. The header comprises a data length code representative of the data length and a data identifier code which includes a nest bit indicative of whether or not one of the tokens is nested in the data set.

According to this invention, the nest level judging device is for judging the selected level and comprises address specifying means for specifying the starting and the end addresses and a varying address varying from the starting address to the end address to make the memory produce the tokens as read-out tokens. The nest level judging device further comprises a header register supplied with the header of each of the read-out tokens as a supplied header for memorizing the data length code and the data identifier code of the supplied header to produce a data length signal representative of the last-mentioned data length code and a nest bit signal having a binary value of one, which represents that each of the read-out tokens is nested in the data set thereof, end address calculating means supplied with the starting address and the data length signal for calculating the end address of each of the read-out tokens as a calculated address, and selecting means having first through N-th output ports in correspondence to the first through the N-th nest levels, respectively, and supplied with the calculated address and successively with selection signals for selecting the first through the N-th output ports one at a time as a selected port to deliver the calculated address to the selected port. The selecting means thereby delivers the calculated address of the read-out tokens to the first through the N-th output ports as first through N-th selected addresses when successively supplied with the selection signals. The nest level judging device still further comprises decision means connected to the address specifying means, the header register, and the selecting means for deciding in response to the varying address, the nest bit signal, and the first through the N-th selected addresses a decided nest level indicative of one of the first through the N-th nest levels that is selected as the selected level. The decision means produces a decided level signal representation of the decided nest level as one of the selection signals that is supplied to the selecting means next following each of the selection signals.

DESCRIPTION OF THE PREFERRED EMBODIMENT

Referring to FIGS. 1(a) through (e), description will be made at first with regard to a token train transmitted between heterogeneous data processing system (not shown). The token train comprises a plurality of tokens. Each of the tokens comprises a plurality of octets (eight bit code) and is specified at a starting position and an end position thereof. Each of the tokens has a nest level selected from first through N-th nest levels as a selected level, where N represents a predetermined natural number which is equal to, for example, sixty-four. The first through the N-th nest levels are a lowest through a highest nest level, respectively. Each of the tokens comprises a header and a data set. The data set is either a set of data, such as DATA(1) through DATA(4), or a text, such as TX(1) through TX(4). The data DATA (suffixes omitted) may correspond to a body of a letter. The text TX (suffixes omitted) may correspond to a title or a gist of the letter. The data set has a data length and is for nesting one of the tokens that has a higher nest level than selected level by one level and will be referred to as a particular token. The header comprises a data length code representative of one of the data lengths, such as first through eighth data length codes LL(1) to LL(8), in the respective tokens and a data identifier code which represents a processing function of the data set and will presently be described in connection with the figure. The data length code is classified into an LL code for representing a data length in a short form and an L code for representing the data length in a long form. The data identifier code consists of first through eighth bits. The sixth bit is a nest bit indicative of whether or not the particular token is nested in the data set. The data identifier code is depicted at ID* (suffixes omitted) when the nest bit indicates that the particular token is nested in the data set. In this event, the nest bit may be a bit of a binary one. The data identifier code is depicted at ID (suffixes omitted) if the nest bit indicates that the particular token is not nested in the data set. Under the circumstances, the nest bit is a bit of a binary zero.

Figure 1:
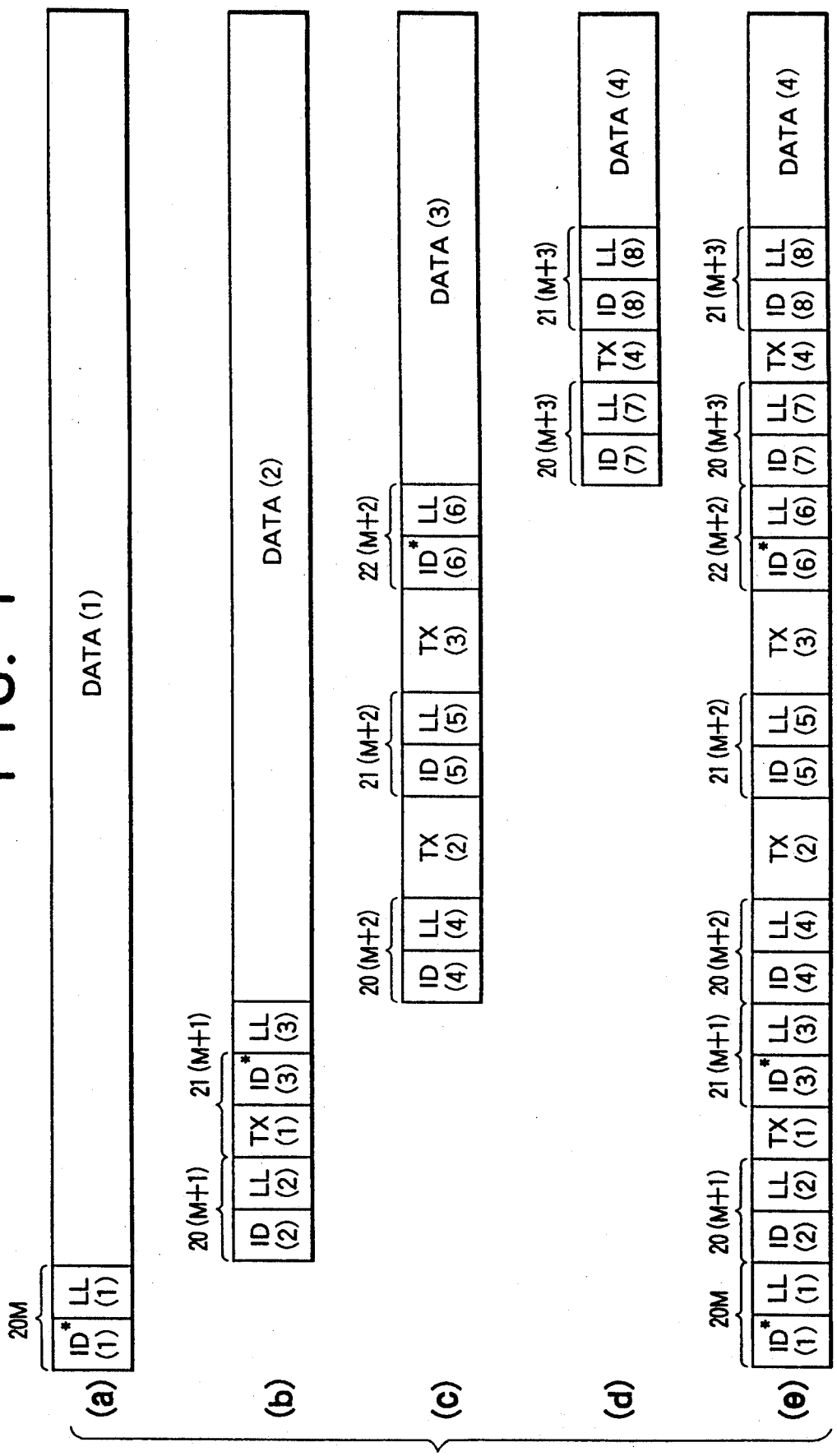
FIGS. 1(a) through (e) show examples of tokens having different nest levels and a token train comprising the tokens supplied to a nest level judging device according to the present invention.

It will be assumed that tokens illustrated in FIGS. 1(a) to (d) are given M-th, (M+1)-th, (M+2)-th, and (M+3)-th nest levels, respectively, where M represents a positive integer which is not less than one and is not greater than the predetermined natural number N less three. In FIG. 1(a), a token having the M-th nest level comprises a header 20M in addition to the data DATA(1). The header 20M comprises a first data identifier code ID*(1) including a nest bit of the binary one and the first data length code LL(1). Therefore, the data DATA(1) nests a plurality of tokens, each having the (M+1)-th nest level, as will be described in conjunction with FIG. 1(b). The token having the nest bit of the binary one such as the token illustrated in FIG. 1(a) will be called a constructor token. The token having the nest bit of the binary zero will be called a primitive token.

In FIG. 1(b), one of tokens that has the (M+1)-th nest level, comprises a header 20(M+1) and the text TX(1). Another of tokens that has the (M+1)-th nest level, comprises a header 21(M+1) and the data DATA(2). The header 20(M+1) comprises a second data identifier code ID(2) including a nest bit of the binary one and the second data length code LL(2). The header 21(M+1) comprises a third data identifier code ID*(3) including a nest bit of the binary one and the third data length code LL(3). Therefore, the data DATA(2) nests a plurality of tokens, each having the (M+2)-th nest level, in the manner which will be described in conjunction with FIG. 1(c).

In FIG. 1(c), one of tokens that has the (M+2)-th nest level, comprises a header 20(M+2) and the text TX(2). Another of tokens that has the (M+2)-th nest level, comprises a header 22(M+2) and the data DATA(3). The header 20(M+2) comprises a fourth data identifier code ID(4) and the fourth data length code LL(4). The header 21(M+2) comprises a fifth data identifier code ID(5) and the fifth data length code LL(5). The header 22(M+2) comprises a sixth data identifier code ID*(6) and the sixth data length code LL(6). Therefore, the data DATA(3) nests a plurality of tokens, each having the (M+3)-th nest level, as will be described in connection with FIG. 1(d).

In FIG. 1(d), one of tokens that has the (M+3)-th nest level, comprises a header 20(M+3) and the text TX(4). Another of tokens that has the (M+3)-th nest level, comprises a header 21(M+3) and the data DATA(4). The header 20(M+3) comprises a seventh data identifier code ID(7) and the seventh data length code LL(7). The header 21(M+3) comprises an eighth data identifier code ID(8) and the eighth data length code LL(8).

Referring to FIG. 1(e), the illustrated token train comprises the tokens shown in FIGS. 1(a) to (d). It is assumed that the first through the eighth data length codes LL(1) to LL(8) are representative of first through eighth data lengths L1, L2, L3, L4, L5, L6, L7, and L8, respectively. In addition, the header 20M, 20(M+1), 21(M+1), 20(M+2), 21(M+2), 22(M+2), 20(M+3), and 21(M+3) have first through eighth header length LH1, LH2, LH3, LH4, LH5, LH6, LH7, and LH8, respectively.

It should be noted here that there are first and second cases as regards the data length code represented by the data length code. In the first case, the data length is defined so as to make the data length comprise the header lengths which will presently be described. In the second case, the data length is defined so as not to make the data length comprise the header lengths.

In the first case, the lengths are related to one another by:

$$L1 = L2 + L3 + LH2 + LH3, \quad (1)$$

$$L3 = L4 + L5 + L6 + LH4 + LH5 + LH6, \quad (2)$$

$$L6 = L7 + L8 + LH7 + LH8. \quad (b\ 3)$$

It is possible in general to understand that, when a token having an i-th nest level comprises a data identifier code ID*, a data length code LL(i) representative of a data length Li, and a data set DATA(i), then another token having an (i+1)-th nest level is nested in the data set DATA(i), where i represents a natural number which is not greater than the predetermined natural number N less one. After supplied with the data set DATA(i), the nest level, namely, a selected level is returned to the i-th nest level.

In the example illustrated in FIG. 1(e), the selected level is shifted from the M-th next level to the (M+1)-th nest level after supplied with the header 20M. After the header 21(M+1) is supplied, the selected level is shifted from the (M+1)-th nest level to the (M+2)-th nest level. After the header 22(M+2) is supplied, the selected level is shifted from the (M+2)-th nest level to the (M+3)-th nest level. After the data DATA(4) is supplied, the selected level is returned from the (M+3)-th nest level to the M-th nest level.

If, instead of Equation (1), the first data length L1 is related to the second and the third data lengths L2 and L3 and the second and the third header lengths LH2 and LH3 by:

$$L1 > L2 + L3 + LH2 + LH3, \quad (1')$$

the selected level is shifted from the (M+3)-th nest level to the (M+1)-th nest level after the data DATA(4) is supplied.

Figure 2:
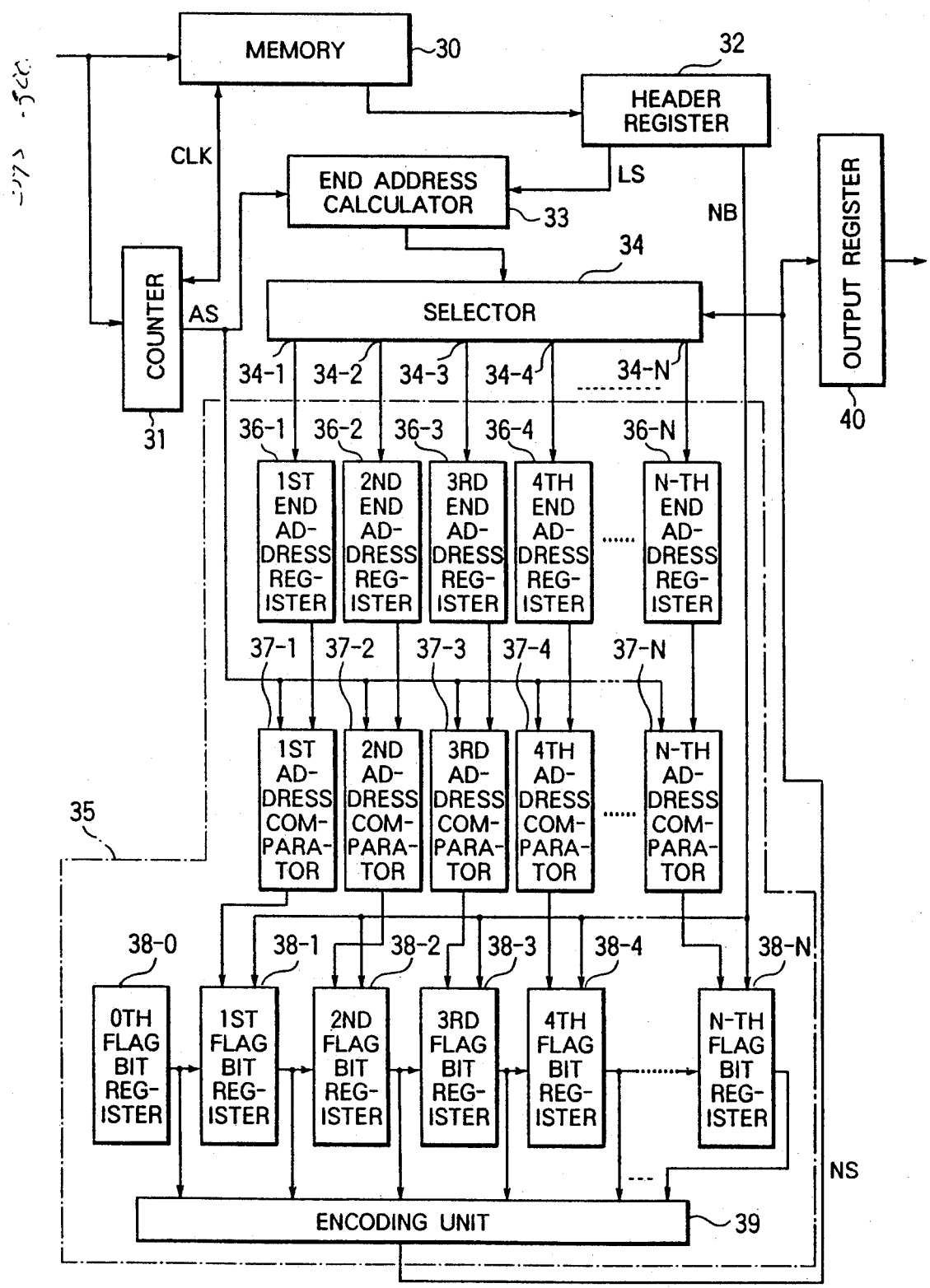
FIG. 2 is a block diagram of a nest level judging device according to an embodiment of the present invention.

Referring to FIG. 2, the description will proceed to a nest level judging device according to a preferred embodiment of this invention. Let the nest level judging device be successively supplied with first through eighth tokens illustrated in FIG. 1(e). The nest level judging device is for judging the nest level of each of the tokens to produce a nest level signal NS representative of a decided nest level. A memory 30 memorizes each of the tokens as memorized tokens, starting at a starting address and ending at an end address. The memory 30 may comprise a register or a first-in first-out memory.

A counter 31 is successively supplied with the first through the eighth tokens and counts the number of the octets of each of the tokens. The counter 31 is given a predetermined initial valve and calculates a sum of the initial value and the number of the octets. The counter 31 produces a count signal representative of the sum as an address signal AS for specifying the starting and the end addresses and a varying address represented by an address code varying from the starting address to the end address. The counter 31 may be implemented by an address generating unit known in the art. The counter 31 further produces a clock signal CLK for accessing the memory 30 to make the memory 30 produce the memorized tokens as read-out tokens. In the manner known in the art, the counter 31 is reset when the varying address reaches the end address of the first token. The counter 31 serves as an address specifying unit.

It will be assumed that the nest level signal NS has the first nest level of level one. A header register 32 is supplied with a first header of the first token which is supplied from the memory 30 as a first one of the read-out tokens. The header register 32 memorizes the first data identifier code ID*(1) and the first data length code LL(1) of the first header and produces a nest bit signal NB having the nest bit of the binary one and a data length signal LS representative of the first data length code. Supplied with the data length signal LS, an end address calculator 33 calculates a sum of the address code represented by the address signal AS and the first data length code as a first calculated address and produces a first calculated signal representative of the first calculated address. The first calculated address may be equal to an end address of the first token. It is to be noted here that the address code calculated by the end address calculator 33 is generated simultaneously with supply of the first data length code to the header register 32.

The end address calculator 33 consumes fifty nanoseconds at most for calculating the end address. This means that it is possible to process the letter in real time, which is transferred at a transfer speed of twenty megabits per second.

A selector 34 has first through N-th output ports 34-1 to 34-N in correspondence to the first through the N-th nest levels, respectively. Supplied with the nest level signal NS and the first calculated signal, the selector 34 selects the first output port 34-1 from the first through the N-th output ports 34-1 to 34-N because the nest level signal NS has the first nest level. The selector 34 delivers a selected signal to the first output port 34-1 as a first selected signal.

A decision unit 35 comprises first through N-th end address registers 36-1 to 36-N connected to the first through the N-th output ports 34-1 to 34-N, respectively. The first end address register 36-1 is supplied with the first selected signal through the first output port 34-1 and memorizes the first selected signal as a first memorized signal. The first end address register 36-1 produces the first memorized signal as a first end address signal.

First through N-th address comparators 37-1 to 37-2 are connected to the first through the N-th end address registers 36-1 to 36-N, respectively. Supplied with the first end address signal and the address signal AS, the first address comparator 37-1 compares the first calculated address with the varying address. The first address comparator 37-1 produces a first coincidence signal indicative of the binary one only when the first calculated address coincides with the varying address. At this moment, the first calculated address is not coincident with the varying address.

The decision unit 35 further comprises zeroth through N-th flag bit registers 38-0 to 38-N connected in cascade to one another. The zeroth flag bit register 38-0 is for producing a zeroth flag bit signal representative of a binary one. The first through the N-th flag bit registers 38-1 to 38-N produce first through N-th flag bit signals, respectively, representative of the binary one when the first through the N-th flag bit registers 38-1 to 38-N are supplied with the nest bit signal NB of the binary one and when each preceding flag bit register which precedes the first through the N-th flag bit registers 38-1 to 38-N supplies each of the zeroth through the (N-1)-th flag bit signals of the binary one to each of the following registers that follows each preceding flag bit register. The first through the N-th flag bit registers 38-1 to 38-N are reset by the first through the N-th coincidence signals, respectively. The first through the N-th flag bit registers 38-1 to 38-N are connected to the first through the N-th address comparators 37-1 to 37-N, respectively.

Under the circumstances, the first flag bit register 38-1 produces a first flag bit signal indicative of the binary one on reception of the zeroth flag bit signal and the nest bit signal NB of the binary one. The first flag bit register 38-1 is reset by the first coincidence signal indicative of the binary one. This applies to each of the second through the N-th flag bit registers 38-2 to 38-N. In the example being illustrated, only the first flag bit register 38-1 produces the first flag bit signal of the binary one. The second through the N-th flag bit registers 38-2 to 38-N produce second through N-th flag bit signals, respectively, all of which indicate the binary zero.

An encoding unit 39 is supplied with the zeroth and the first flag bit signals both of which indicate the binary one and with the second through the N-th flag bit signals all of which indicate the binary zero. In this event, the encoding unit 39 produces the nest level signal NS which indicates the second nest level of level two as the decided nest level. The nest level signal NS is delivered to an output register 40. The output register 40 memorizes the nest level signal NS and supplies an output nest level signal to a protocol conversion device (not shown).

Next, the header register 32 is supplied with a second header of the second token. The header register 32 memorizes the second data identifier code ID(2) and the second data length code LL(2) of the second header and produces the data length signal LS representative of the second data length code and the nest bit signal NB having the nest bit of the binary zero because the second token is the primitive token. Supplied with the data length signal LS, the end address calculator 33 calculates a sum of the address code of the varying address and the second data length code as a second calculated address and produces a second calculated signal representative of the second calculated address. The second calculated address may be equal to an end address of the second token.

Supplied with the nest level signal NS and the second calculated signal, the selector 34 selects the second output port 34-2 from the first through the N-th output ports 34-1 to 34-N because the nest level signal NS has the second nest level. The selector 34 delivers the selected signal to the second output port 34-2 as a second selected signal.

The second end address register 36-2 is supplied with the second selected signal through the second output port 34-2 and memorizes the second selected signal as a second memorized signal. The second end address register 36-2 produces the second memorized signal as a second end address signal.

Supplied with the second end address signal and the address signal AS, the second address comparator 37-2 compares the second end address with the varying address. If the second end address is equal to the varying address, this means that the varying address reaches the end address of the second token. The second address comparator 37-2 produces a second coincidence signal indicative of the binary one when the second end address coincides with the varying address. Although the second flag bit register 38-2 is supplied with the second coincidence signal of the binary one, the second flag bit register 38-2 produces a second flag bit signal indicative of the binary zero because the nest bit signal NB has the nest bit of the binary zero.

The encoding unit 39 is supplied with the zeroth and the first flag bit signals, both of which indicate the binary one. The encoding unit 39 is furthermore supplied with the second through the N-th flag bit signals, all of which indicate the binary zero. Under the circumstances, the encoding unit 39 holds the nest level signal NS which indicates the second nest level of level two as the decided nest level.

Let the nest level be the fourth nest level of level four. In this event, the zeroth through the fourth flag bit registers 38-0 to 38-4 may produce the zeroth through the fourth flag bit signals, each of which indicates the binary one. In the above-mentioned manner, each of the first through the fourth address comparators 37-1 to 37-4 is supplied with the first through the fourth end address signals and compares the varying address with the first through the fourth calculated addresses at the same time. If the varying address coincides with the fourth calculated address while the varying address is not coincident with the third calculated address, the fourth flag bit register 38-5 is reset. As a result, the decided nest level is shifted from the fourth nest level of level four to the third nest level of level three. If the varying address coincides with all of the second through the fourth calculated addresses, all of the first through the fourth flag bit registers 38-1 to 38-4 are reset in the manner mentioned above. As a result, the decided nest level is shifted from the fourth nest level of level four to the first nest level of level one. It is desirable that the first through N-th end address registers 36-1 to 36-N are reset together with the first through the N-th flag bit registers 38-1 to 38-N, respectively.

Figure 3:
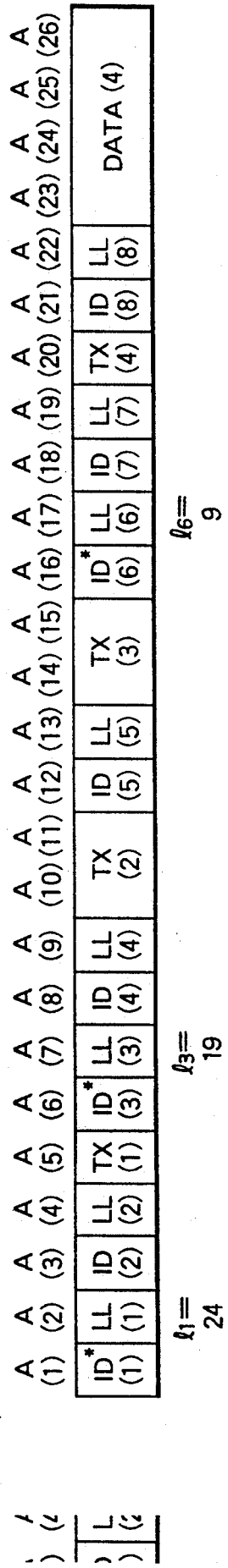
FIG. 3 shows an example of tokens memorized in a memory for use in the nest level judging device depicted in FIG. 2.
Figure 4:
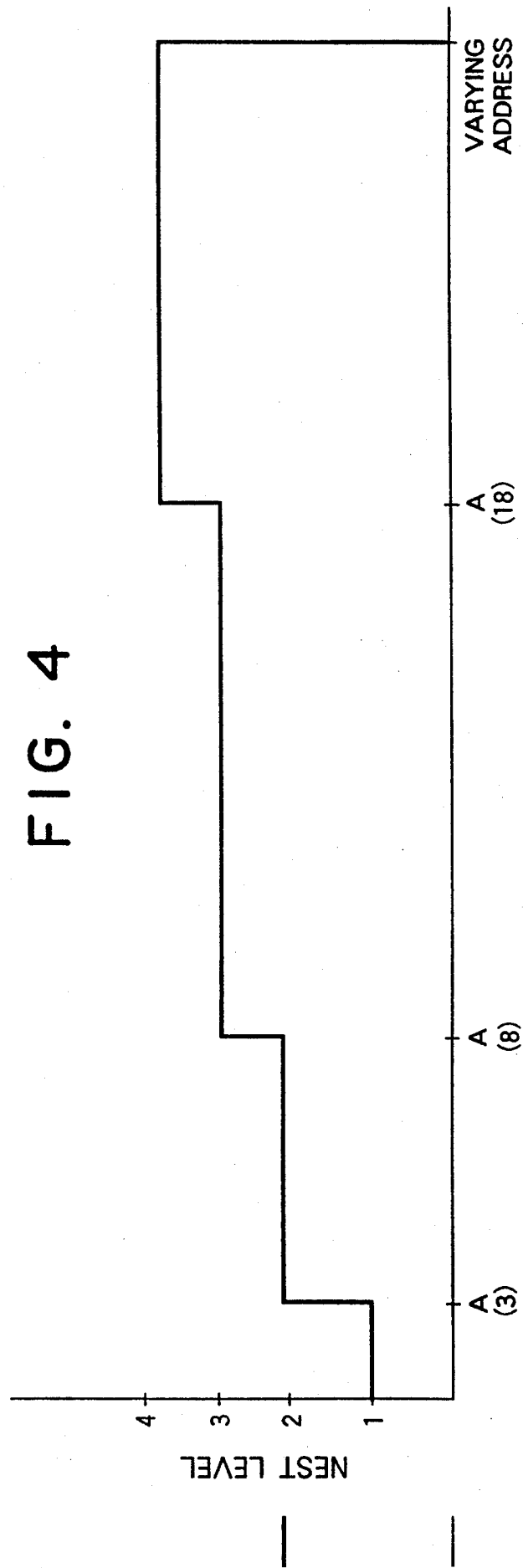
FIG. 4 shows a graphical representation for use in describing variation of a nest level.

Referring to FIGS. 3 and 4, the description will be made as regards relation between the varying address and the nest level. Let the nest level judging device be supplied with the first through the eighth tokens as before. The first through the eighth tokens are memorized in a plurality of parts represented by first through twenty-sixth addresses A(1) to A(26) of the memory 30. Each of the first through the twenty-sixth addresses A(1) to A(26) corresponds to each of the octets. The first token is the constructor token having the first nest level of level one and has the first header memorized in the first and the second addresses A(1) and A(2). The first header has the first identifier code ID*(1) including the nest bit of the binary one and has the first data length code LL(1) which is equal to twenty-four octets. The second token is the primitive token and has the second header memorized in the third and the fourth addresses A(3) and A(4). The second header has the second identifier code ID(2) including the nest bit of the binary zero and has the second data length code LL(2). As shown in FIG. 4, the decided nest level is shifted from the first nest level of level one to the second nest level of level two when the varying address reaches the third address A(3). At the second header, the nest level is held at the second nest level by the reason described in conjunction with FIG. 2. The decided nest level is shifted from the second nest level to the third nest level of level three when the varying address is equal to the eighth address A(8). When the varying address reaches the eighteenth address A(18), the decided nest level is shifted from the third nest level to the fourth nest level of level four. The decided nest level is shifted from the fourth nest level to the first nest level without fail when the varying address reaches the twenty-sixth address A(26), namely, the end address of the first token.

Figure 5:
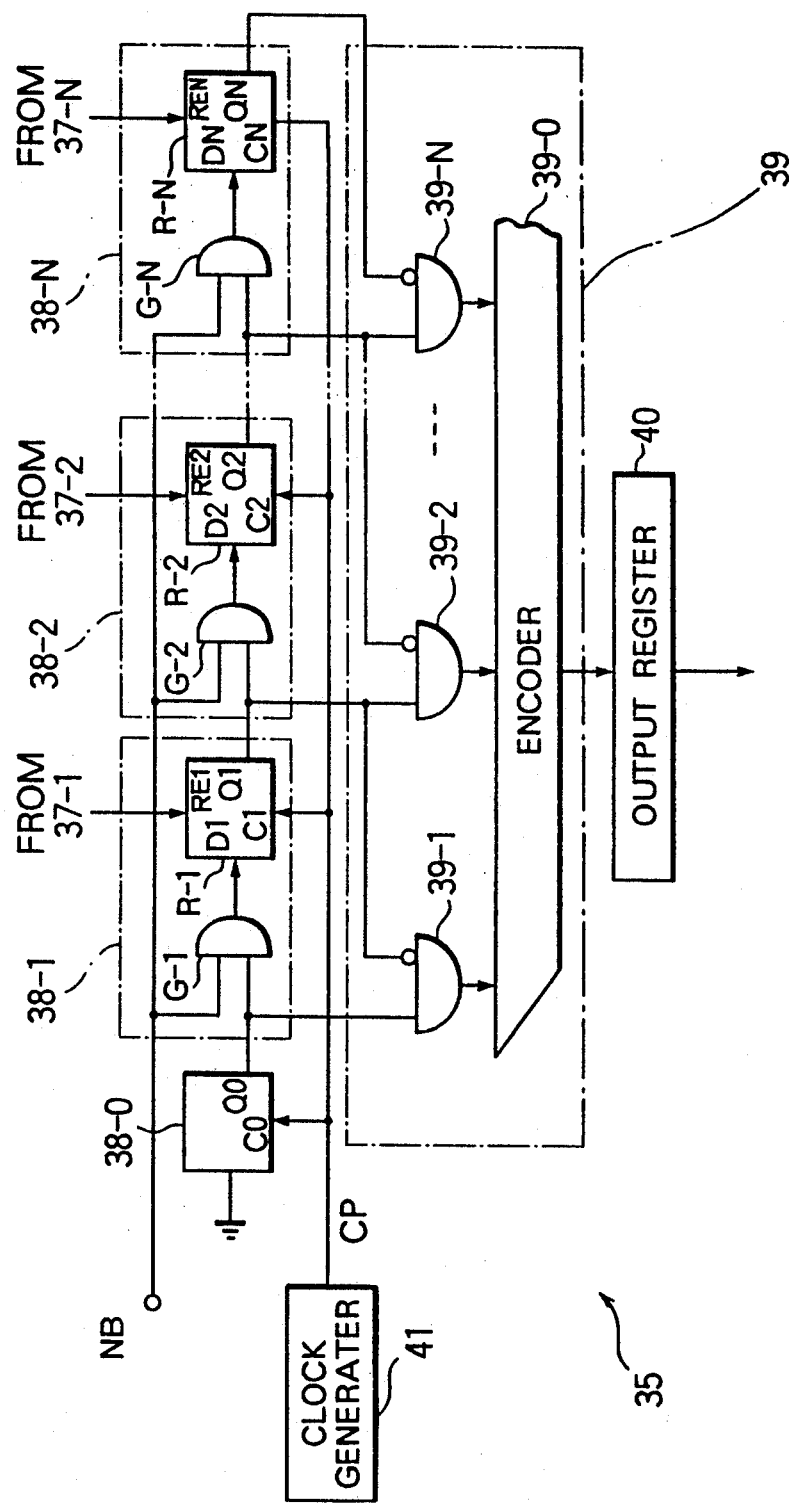
FIG. 5 is a block diagram of a decision unit illustrated in FIG. 2.

Referring to FIG. 5, the description will be made as regards the zeroth through the N-th flag bit registers 38-0 to 38-N and the encoding unit 39. The decision unit 35 further comprises a clock generator 41 for generating a clock pulse signal CP in synchronism with supply of each of the first through the N-th data identifier codes to the header register 32 (FIG. 2). Supplied with the clock pulse signal CP, the zeroth flag bit register 38-0 produces the zeroth flag bit signal indicative of the binary one. The first flag bit register 38-1 comprises a first AND gate G-1 supplied with the zeroth flag bit signal and the nest bit signal NB. The first AND gate G-1 produces a first AND'ed signal representative of the binary one only when the nest bit signal NB indicates the binary one. A first register R-1 is supplied with the first AND'ed signal through a first input terminal D1. The first register R-1 produces the first flag bit signal of the binary one through a first output terminal Q1 on reception of the clock pulse signal CP. As mentioned before, the first register R-1 is reset by the first coincidence signal supplied from the first address comparator 37-1 through a first reset terminal RE1. Each of the second through the N-th flag bit registers 38-2 to 38-N comprises similar parts, such as a second AND gate G-2, and is likewise operable.

The encoding unit 39 comprises an encoder 39-0 and first through N-th inhibit gates 39-1 to 39-N. The first inhibit gate 39-1 is supplied with the zeroth flag bit signal directly and with the first flag bit signal through an inhibit terminal depicted at white circle. Supplied with the zeroth flag bit signal and the first flag bit signal of the binary zero, the first inhibit gate 39-1 produces a first gate signal having the binary value of one. Likewise, the second inhibit gate 39-2 produces a second gate signal of the binary one on reception of the first flag bit signal of the binary one and the second flag bit signal of the binary zero. This applies to the third through the N-th inhibit gates.

Let the nest level signal NS has the first nest level of level one. In this event, only the zeroth flag bit register 38-0 produces the zeroth flag bit signal of the binary one. When the header register 32 (FIG. 2) is supplied with the constructor token, the first flag bit register 38-1 is supplied with the nest bit signal NB having the nest bit of the binary one from the header register 32. Supplied with the nest bit signal NB, the first AND gate G-1 produces the first AND'ed signal having the binary one because the first AND gate G-1 is already supplied with the zeroth flag bit signal of the binary one. As a result, the first register R-1 delivers the first flag bit signal of the binary one to the second flag bit register 38-2 and the first and the second inhibit gates 39-1 and 39-2. Supplied with the first flag bit signal of the binary one, the first inhibit gate 39-1 delivers the first gate signal indicative of the binary zero to the encoder 39-0. On the other hand, the second inhibit gate 39-2 produces the second gate signal having the binary value of one because the second inhibit gate 39-2 is already supplied with the second flag bit signal of the binary zero. Supplied with the first gate signal of the binary zero, the second gate signal of the binary one, and the third through the N-th gate signals each of which has the binary zero, the encoder 39-0 delivers the second nest level signal of level two to the output register 40. If the header register 32 is supplied with the constructor token again, only the third inhibit gate (not shown) delivers the third gate signal having the binary one to the encoder 39-0. In this event, the encoder 39-0 produces the third nest level signal of level three.

Generally speaking, when the n-th flag bit register (not shown) produces an n-th flag bit signal having the binary value of one, where n is variable from one to N, and when the (n+1)-th flag bit register (not shown) produces an (n+1)-th flag bit signal having the binary zero, the encoder 39-0 produces the nest level signal NS indicative of an (n+1)-th nest level of level (n+1). The n-th flag bit register is, however, reset on reception of an n-th coincidence signal of the binary one. At this moment, if an (n−1)-th flag bit register (not shown) keeps the supply of the (n−1)-th flag bit signal of the binary one to the encoding unit 39, the encoder 39-0 produces the nest level signal NS indicative of an (n−1)-th nest level of level (n−1). If the n-th flag bit register is reset by an n-th coincidence signal of the binary one in addition to the n-th flag bit register, the nest level is shifted from the (n−1)-th level to an (n−1)-th level of level (n−2). Furthermore, if all of the second through the n-th flag bit register are reset, the nest level is shifted from the (n−1)-th level to the first level.

As obvious from the above, the nest level judging device can decide the nest level within a time period equal to one clock of the clock signal CLK because the judging device comprises N end address registers, N address comparators, and N flag bit registers where the predetermined natural number N is the number of the nest level and because the address comparators and the flag bit registers operate in parallel with one another. The judging device can be implemented by a single LSI chip.

While this invention has thus far been described in conjunction with a preferred embodiment thereof, it will readily be possible for those skilled in the art to put this invention into practice in various other manners. For example, the memory 30 may be implemented by a random access memory. In this event, the counter 31 supplies the address signal A5 to the memory 30 for accessing the memory 30 to make the memory 30 produce the memorized tokens.

What is claimed is:

1. A nest level judging device supplied with a plurality of tokens from a memory for memorizing each of said tokens starting at a starting address and ending at an end address, each of said tokens having a nest level selected from first through N-th nest levels as a selected level, where N represents a predetermined natural number, said first through said N-th nest levels being a lowest through a highest nest level, respectively, each of said tokens comprising a header and a data set, said data set having a data length and being for nesting one of said tokens that has a higher nest level than said selected level, said header comprising a data length code representative of said data length and a data identifier code which includes a nest bit indicative of whether or not said one of the tokens is nested in said data set, said nest level judging device being for judging said selected level and comprising:

address specifying means for specifying said starting and said end addresses and a varying address varying from said starting address to said end address to make said memory produce said tokens as read-out tokens;

a header register supplied with the header of each of said read-out tokens as a supplied header for memorizing the data length code and the data identifier code of said supplied header to produce a data length signal representative of the last-mentioned data length code and a nest bit signal having a binary value of one, which represents that said each of the read-out tokens is nested in the data set thereof;

end address calculating means supplied with said varying address and said data length signal for calculating the end address of said each of the read-out tokens as a calculated address;

selecting means having first through N-th output ports in correspondence to said first through said N-th nest levels, respectively, and supplied with said calculated address and with each of successively supplied selection signals for selecting said first through said N-th output ports one at a time as a selected port to deliver the calculated address to said selected port, said selecting means thereby delivering the calculated address of said read-out tokens to said first through said N-th output ports as first through N-th selected addresses when successively supplied with said selection signals; and decision means connected to said address specifying means, said header register, and said selecting means for deciding in response to said varying address, said nest bit signal, and said first through said N-th selected addresses a decided nest level indicative of one of said first through said N-th nest levels that is selected as said selected level, said decision means producing a decided level signal representative of said decided nest level as one of said selection signals that is supplied to said selecting means next following said each of the selection signals.

2. A nest level judging device as claimed in claim 1, wherein said decision means comprises:

first through N-th end address registers connected to said first through said N-th output ports, respectively, for memorizing said first through said N-th selected addresses as first through N-th memorized addresses, respectively;

first through N-th address comparing means connected to said address specifying means and said first through said N-th end address registers for comparing said varying address with said first through said N-th memorized addresses to produce first through N-th coincidence signals when said varying address coincides with said first through said N-th memorized addresses;

a zeroth flag bit register for producing a zeroth flag bit signal representative of a binary one;

first through N-th flag bit registers connected in cascade to one another and connected to said first through said N-th address comparing means, respectively, and said header register to produce first through N-th flag bit signals representative of the binary one when said first through said N-th flag bit registers are supplied with said nest bit signal of the binary one and when each preceding flag bit register which precedes said first through said N-th flag bit registers supplies each of said zeroth through said (N−1)-th flag bit signals of the binary one to each of the following registers that follows each preceding flag bit register, said first through said N-th flag bit registers being reset by said first through said N-th coincidence signals, respectively; and encoding means connected to said zeroth through said N-th flag bit registers for encoding said zeroth through said N-th flag bit signals to produce an encoded signal as said decided level signal.

* * * * *